(12) United States Patent
Kondo et al.

(10) Patent No.: US 7,724,152 B2
(45) Date of Patent: May 25, 2010

(54) TAP CHANGE OPERATION MONITORING APPARATUS FOR ON-LOAD TAP CHARGER

(75) Inventors: Daisuke Kondo, Tokyo (JP); Hideo Shinohara, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 367 days.

(21) Appl. No.: 11/793,813

(22) PCT Filed: Apr. 27, 2006

(86) PCT No.: PCT/JP2006/308856

§ 371 (c)(1),
(2), (4) Date: Jun. 22, 2007

(87) PCT Pub. No.: WO2006/120919

PCT Pub. Date: Nov. 16, 2006

(65) Prior Publication Data

US 2008/0129524 A1    Jun. 5, 2008

(30) Foreign Application Priority Data

| May 9, 2005 | (JP) | ............................. 2005-135878 |
| May 12, 2005 | (JP) | ............................. 2005-139456 |

(51) Int. Cl.
*G08B 21/00* (2006.01)

(52) U.S. Cl. ...................... 340/646; 340/635; 340/657; 200/11 TC; 307/17

(58) Field of Classification Search .................. 340/646
See application file for complete search history.

(56) References Cited

U.S. PATENT DOCUMENTS 4,595,806 A * 6/1986 Itoh ........................ 200/11 TC (Continued)

FOREIGN PATENT DOCUMENTS

JP    63-62309 A    3/1988

(Continued)

OTHER PUBLICATIONS

IEEE Oct. 7-10, 2002, Yokohama, Innovation VACUTAP Maintenance-free VACUTAP On-Load Tap-Changer Monitoring.

*Primary Examiner*—George A Bugg
(74) *Attorney, Agent, or Firm*—Buchanan Ingersoll & Rooney PC

(57) ABSTRACT

It is intended to provide a tap change operation monitoring apparatus for an on-load tap changer which can employ relatively simple and low-cost torque sensing means by mitigating an accuracy requirement with regard to detecting a starting time of tap change operation, acquire torque waveform data concerning tap change operation of a diverter switch in an accurate and reliable fashion, and discriminate an abnormal state of the tap change operation with high accuracy. There is provided waveform processing means 47 including a third low-pass filter 70 for generating processed torque waveform data by removing noise components from torque waveform data, first and second low-pass filters 71, 72 having cutoff frequencies lower than a cutoff frequency of the third low-pass filter 70 for generating shaped torque waveform data, and first and second differentiators 73, 74, a multiplier 75 and a maximal value extractor circuit 76 for together extracting time of occurrence of an extremum of a waveform obtained by differentiating the shaped torque waveform data in the time domain within a specific time period as reference operating time.

10 Claims, 10 Drawing Sheets

U.S. PATENT DOCUMENTS 4,604,503 A * 8/1986 Fuwa .................. 200/11 TC
5,834,717 A * 11/1998 Neumeyer et al. ........ 200/17 R

FOREIGN PATENT DOCUMENTS

| | | |
|---|---|---|
| JP | 4-137511 A | 5/1992 |
| JP | 7-161551 A | 6/1996 |
| JP | 2000-269052 A | 9/2000 |
| JP | 3189542 B2 | 5/2001 |

* cited by examiner

FIG. 3

| | TAP POSITION (POS) | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| UPWARD SWITCHING | TAP SELECTOR 32 ODD-NUMBERED SIDE | ① | 1 | ③ | 3 | ⑤ | 5 | ⑦ | 7 | ⑨ | 9 | ① | 1 | ③ | 3 | ⑤ | 5 | ⑦ | 7 | ⑨ |
| | TAP SELECTOR 32 EVEN-NUMBERED SIDE | 2 | ② | 2 | ④ | 4 | ⑥ | 6 | ⑧ | 8 | Ⓚ | K | ② | 2 | ④ | 4 | ⑥ | 6 | ⑧ | 8 |
| | CHANGEOVER SELECTOR 33 | | | | | + | | | | | | | | | | − | | | | |
| DOWNWARD SWITCHING | TAP SELECTOR 32 ODD-NUMBERED SIDE | ① | 3 | ③ | 5 | ⑤ | 7 | ⑦ | 9 | ⑨ | 1 | ① | 3 | ③ | 5 | ⑤ | 7 | ⑦ | 9 | ⑨ |
| | TAP SELECTOR 32 EVEN-NUMBERED SIDE | 2 | ② | 4 | ④ | 6 | ⑥ | 8 | ⑧ | K | Ⓚ | 2 | ② | 4 | ④ | 6 | ⑥ | 8 | ⑧ | 8 |
| | CHANGEOVER SELECTOR 33 | | | | | + | | | | | | | | | | − | | | | |

FIG. 9

| EXTRACTED ITEM | OPERATING MODE | NORMAL TAP CHANGING | | COARSE-FINE TAP CHANGING | | REVERSE TAP CHANGING | |
|---|---|---|---|---|---|---|---|
| | | UPWARD | DOWNWARD | UPWARD | DOWNWARD | UPWARD | DOWNWARD |
| CHANGEOVER SELECTOR | OPENING TIME | | | ○ | ○ | | |
| | OPENING TORQUE | | | ○ | ○ | | |
| | CLOSING TIME | | | ○ | ○ | | |
| | CLOSING TORQUE | | | ○ | ○ | | |
| TAP SELECTOR | OPENING TIME | ○ | ○ | ○ | ○ | | |
| | OPENING TORQUE | ○ | ○ | ○ | ○ | | |
| | CLOSING TIME | ○ | ○ | ○ | ○ | | |
| | CLOSING TORQUE | ○ | ○ | ○ | ○ | | |
| DIVERTER SWITCH | OPERATION STARTING TIME | ○ | ○ | ○ | ○ | ○ | ○ |
| | IN-OPERATION TORQUE | ○ | ○ | ○ | ○ | ○ | ○ |
| | OPERATION ENDING TIME | ○ | ○ | ○ | ○ | ○ | ○ |
| | OPERATION TIME | ○ | ○ | ○ | ○ | ○ | ○ |
| DRIVE SHAFT OPERATION DATA | TAP CHANGE TIME | ○ | ○ | ○ | ○ | ○ | ○ |
| | TORQUE INTEGRAL VALUE | ○ | ○ | ○ | ○ | ○ | ○ |

CIRCLES (○) INDICATE EXTRACTED DATA ITEMS.

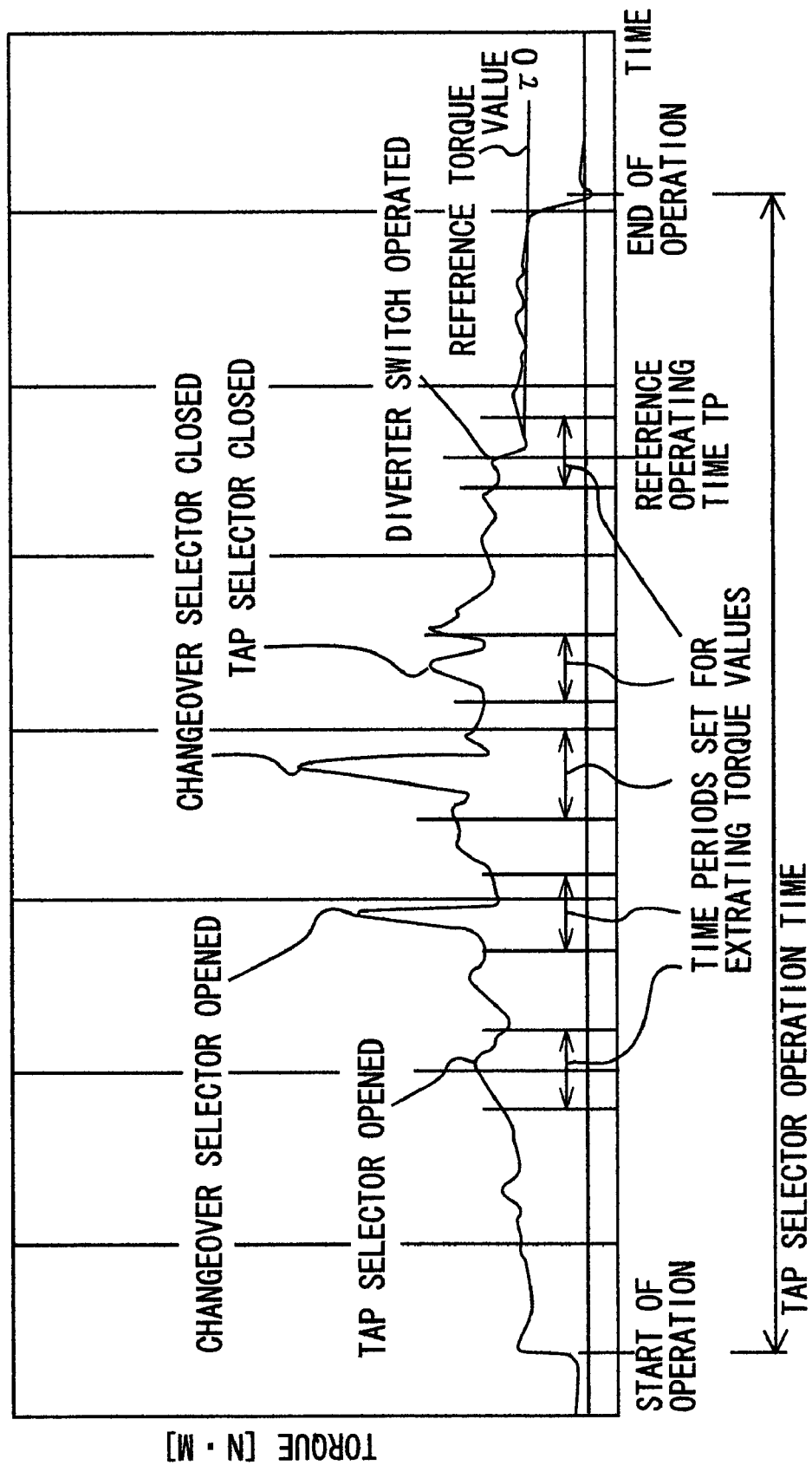

TAP CHANGE OPERATION MONITORING APPARATUS FOR ON-LOAD TAP CHARGER

TECHNICAL FIELD

The present invention relates to a tap change operation monitoring apparatus for an on-load tap changer for monitoring operating conditions of the on-load tap changer which is built in a transformer.

BACKGROUND ART

An on-load tap changer system used with a transformer includes an on-load tap changer having a diverter switch, a tap selector and a changeover selector, and an operating mechanism for operating the on-load tap changer. A tap change operation monitoring apparatus for monitoring tap change operation of this kind of on-load tap changer system is disclosed in Patent Document 1 or Patent Document 2, for example.

A tap change operation monitoring apparatus disclosed in Patent Document 1 includes a torque sensor unit for detecting torque exerted on a drive shaft of an operating mechanism by using a pattern of a sequence of tap change operations, a switching pattern discrimination unit for discriminating switching pattern of tap change operations of a diverter switch, a tap selector and a changeover selector, a normal torque pattern memory unit for storing torque patterns under normal operating conditions for individual switching patterns, an abnormal point discrimination unit for discriminating an abnormal operation point by selecting a normal torque pattern for a specified switching pattern based on an output from the switching pattern discrimination unit and then comparing the selected normal torque pattern with an output from the torque sensor unit, and a normal torque pattern correction unit for correcting memory content of the normal torque pattern memory unit based on a varying tendency of the output of the torque sensor unit representing a torque pattern under normal operating conditions where no operational anomaly is detected.

This apparatus discriminates an abnormal operation point by comparing a tap changing torque pattern at switching action detected by the torque sensor unit during the tap change operation with a tap changing torque pattern under normal operating conditions, detects a tendency for tap changing torque to reduce over time, and corrects the normal torque pattern.

Also, this apparatus determines whether any anomaly exists or not by selecting a normal torque pattern corresponding to each switching pattern and then comparing the normal torque pattern with the output from the torque sensor unit, and specifies an abnormal point from time of occurrence of an anomaly.

A tap change operation monitoring apparatus shown in Patent Document 2 includes current sensing means for detecting motor current in an operating mechanism, torque sensing means for detecting drive shaft torque produced by an on-load tap changer, operating mode discrimination means for discriminating operating mode in which the on-load tap changer performs tap change operation, tap changing data recording means for discriminating and recording motor current waveform data detected by the current sensing means during the tap change operation as well as torque waveform data detected by the torque sensing means for each operating mode, reference data setup means for setting monitoring target specification data for each discriminated operating mode and then presetting and storing reference values of the monitoring target specification data and permissible variable ranges thereof for each operating mode, specification data extraction means for extracting specification data corresponding to the preset monitoring target specification data from the recorded motor current waveform data and torque waveform data, and anomaly judgment means for judging that operating state is abnormal if the permissible variable ranges are exceeded as a result of a comparison between the extracted specification data and the reference values thereof corresponding to the operating mode.

This apparatus assumes operating times of a diverter switch, a tap selector and a changeover selector and presets a specific time period with respect to the torque waveform data detected by the torque sensing means. The apparatus recognizes a point of a maximum value of the waveform within this time period as a specified point and extracts a torque value at this point and time of occurrence thereof. Then, the apparatus compares the extracted values with the reference values stored in the reference data setup means and, if the permissible variable ranges are exceeded, the apparatus judges that the operating state is abnormal. It is therefore possible to make a judgment with simple processing and high accuracy.

Patent Document 1: Japanese Patent Application Publication No. 1992-137511

Patent Document 2: Japanese Patent No. 3189542

DISCLOSURE OF THE INVENTION

Problems to be Solved by the Invention

In detecting an abnormal operating state, the conventional tap change operation monitoring apparatus for the on-load tap changer configured as described above compares detected torque waveform data and torque waveform data under normal operating conditions and judges that operating state is abnormal if a permissible variable range is exceeded, thereby permitting simple processing and high-accuracy judgment. However, the torque waveform data detected by the torque sensing means mounted on a drive shaft of the on-load tap changer which is in actual operation contains noise components superimposed upon torque waveform data indicating a true state of tap change operation and, as a consequence, the torque waveform data represents a pulsating waveform from which it is difficult to read a true value of torque in many cases.

When a maximum torque generated during tap change operation of the diverter switch is to be determined, for example, the maximum torque determined is a maximal value of torque data observed within a specific time period as stated above. This observation time period is set with reference to a starting time of the tap change operation. It is therefore a prerequisite for obtaining correct specification data to exactly detect the starting time of the tap change operation. If an observation is made during a time period set based on an inaccurate starting time, a maximal value appearing within that time period which differs from a maximal value based on the aforementioned specification data may potentially be mistaken for the maximal value based on the aforementioned specification data.

Furthermore, when the torque waveform data represents a pulsating waveform upon which noise components are superimposed, the observation time period should be set as narrow as possible if the influence of these noise components is taken into consideration, and it become yet more important to detect the starting time of the tap change operation in an accurate and reliable fashion.

For this reason, the torque sensing means 24 of the aforementioned Patent Document 2 (refer to FIG. 1 of the Patent Document), for example, employs a customized product which is designed and manufactured integrally with the drive shaft of the operating mechanism. Although this structure enables accurate determination of the starting time of the tap change operation, a cost increase of the apparatus is inevitable. Especially when this kind of monitoring apparatus is to be newly added to an existing tap changer, on-site work is so complex that enormous cost is required. Widespread use of this kind of apparatus has been hindered by the aforementioned problems.

The present invention has been made to solve the aforementioned problems. Accordingly, it is an object of the present invention to provide a tap change operation monitoring apparatus for an on-load tap changer which can employ relatively simple and low-cost torque sensing means by mitigating an accuracy requirement with regard to detecting a starting time of tap change operation, acquire torque waveform data concerning tap change operation of a diverter switch in an accurate and reliable fashion even if the detected torque waveform data is a pulsating waveform containing noise components, and discriminate an abnormal state of the tap change operation with high accuracy.

Means for Solving the Problems

A tap change operation monitoring apparatus for an on-load tap changer according to the present invention includes torque sensing means for detecting drive shaft torque exerted on a drive shaft of an operating mechanism for operating the on-load tap changer which is provided with a diverter switch, a tap selector and a changeover selector, operating mode discrimination means for discriminating operating mode in which the on-load tap changer performs tap change operation, torque waveform data recording means for recording torque waveform data concerning the drive shaft torque detected by the torque sensing means for each operating mode discriminated by the operating mode discrimination means, reference data setup means for setting monitoring target specification data for each operating mode of the on-load tap changer and then setting and storing a reference value of the monitoring target specification data and a management value of a permissible variable range thereof, waveform processing means including a noise filtering circuit for extracting the torque waveform data recorded in the torque waveform data recording means and generating processed torque waveform data from which noise components have been removed by removing frequency components exceeding a specific first frequency from the extracted torque waveform data, a waveform shaping circuit for generating shaped torque waveform data by removing frequency components exceeding a specific second frequency which is lower than the first frequency and set within a range in which a torque change caused by the tap change operation of the diverter switch remains in a torque waveform after shaping, and reference operating time extraction means for extracting time of occurrence of an extremum of a waveform obtained by differentiating the shaped torque waveform data in the time domain within a specific time period as reference operating time, specification data extraction means for extracting data corresponding to the monitoring target specification data as specification data from the reference operating time extracted by the waveform processing means and the processed torque waveform data, and anomaly judgment means for comparing the specification data extracted by the specification data extraction means with the reference value set by the reference data setup means and judging that an anomaly has occurred if the result of comparison exceeds the management value of the permissible variable range.

ADVANTAGEOUS EFFECTS OF THE INVENTION

The present invention is provided, in particular, with waveform processing means which includes a noise filtering circuit for generating processed torque waveform data from which noise components have been removed by removing frequency components exceeding a specific first frequency from the torque waveform data fed from the torque sensing means, a waveform shaping circuit for generating shaped torque waveform data by removing frequency components exceeding a specific second frequency which is lower than the first frequency and set within a range in which a torque change caused by tap change operation of a diverter switch remains in a torque waveform after shaping, and reference operating time extraction means for extracting time of occurrence of an extremum of a waveform obtained by differentiating the shaped torque waveform data in the time domain within a specific time period as reference operating time as described above. Accordingly, there occurs a point at which the torque change existing during the tap change operation of the diverter switch is maximized, so that it is possible to detect torque data during the tap change operation of the diverter switch in a reliable fashion by extracting this time as the reference operating time even if a slight error occurs in tap change starting time determined from the torque waveform data fed from the torque sensing means. It is therefore possible to judge whether any anomaly has occurred with high accuracy using a simple and low-cost structure.

BRIEF DESCRIPTION OF THE DRAWINGS

FIG. 3 is a diagram showing a relationship among tap positions of the on-load tap changer and make-break states of individual constituent elements thereof;

FIG. 9 is a diagram showing a listing of items detected in each operating mode; and FIG. 10 is a diagram showing an example of processed torque waveform data in the case of upward changeover selector switching.

DESCRIPTION OF THE SYMBOLS

Figure 1:
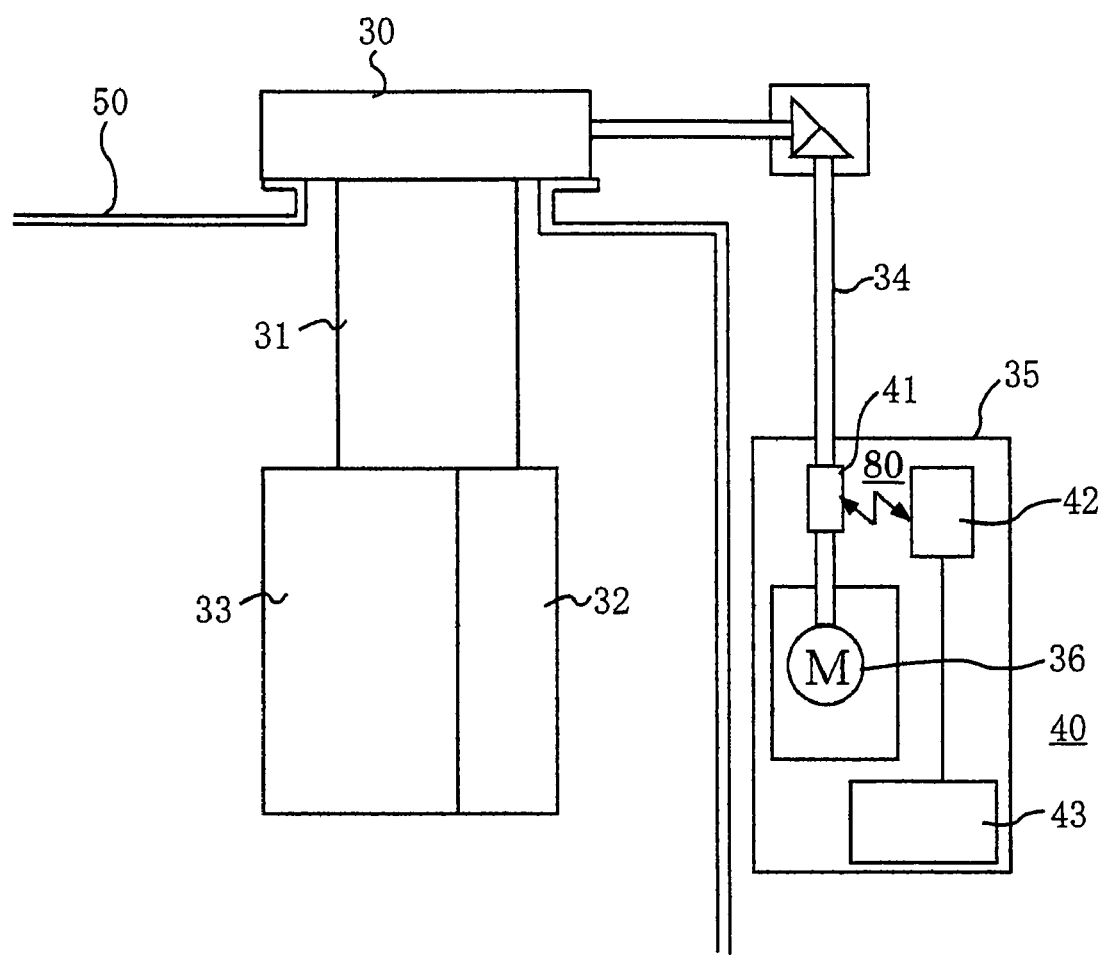
FIG. 1 is a diagram showing the structure of an on-load tap changer and a tap change operation monitoring apparatus therefor according to a first embodiment of the present invention.

30 On-load tap changer
31 Diverter switch
32 Tap selector
33 Changeover selector
34 Drive shaft
40 Tap change operation monitoring apparatus
41 Rotary unit of torque sensing means
42 Stationary unit of torque sensing means
43 Signal processing unit
44 Operating mode discrimination means
45 Torque waveform data recording means
46 Reference data setup means
47 Waveform processing means
48 Specification data extraction means
49 Anomaly judgment means
61 Specification data storage means
62 Specification data management value calculating means
63 Reference data setup means
70 Third low-pass filter
71 First low-pass filter
72 Second low-pass filter
73 First differentiator
74 Second differentiator
75 Multiplier
76 Maximal value extractor circuit
80 Torque sensing means

BEST MODES FOR CARRYING OUT THE INVENTION

First Embodiment

A first embodiment of the present invention is now described in the following. FIG. 1 is a diagram showing the structure of a tap change operation monitoring apparatus for an on-load tap changer according to the first embodiment.

The on-load tap changer 30 which is provided with a diverter switch 31, a tap selector 32 and a changeover selector 33 is assembled into a transformer 50.

The on-load tap changer 30 is operated by an operating mechanism 35 with a drive shaft 34 interconnecting the on-load tap changer 30 and a motor 36 provided in the operating mechanism 35. The drive shaft 34 is equipped with torque sensing means 80 for detecting drive torque during operation.

The torque sensing means 80 employed in this embodiment for detecting torque of the drive shaft 34 is a separate type including a rotary unit 41 and a stationary unit 42 which can be accommodated relatively easily at low cost even when the tap change operation monitoring apparatus is added to an existing on-load tap changer. Described below is the structure of the torque sensing means 80.

The rotary unit 41 which is attached to the drive shaft 34 and turns with rotation of the drive shaft 34 is mounted on an outer surface of the rotating drive shaft 34 and provided with a torque sensor for detecting the drive shaft torque and first transmit/receive means. In addition, the rotary unit 41 incorporates a battery for driving the torque sensor and the first transmit/receive means. The stationary unit 42 affixed inside the operating mechanism 35 is provided with a second transmit/receive means which exchanges signals with the first transmit/receive means of the rotary unit 41 through a wireless link by using infrared signals, for instance. Illustration of the internal structure of the rotary unit 41 and the stationary unit 42 is not provided here.

When a tap changing command signal from the on-load tap changer is transmitted from the second transmit/receive means of the stationary unit 42 and received by the first transmit/receive means of the rotary unit 41, electric power is supplied from the battery, causing the torque sensor to begin detecting operation. Resultant detection data is transmitted from the first transmit/receive means of the rotary unit 41, received by the second transmit/receive means of the stationary unit 42 and then sent to torque waveform data recording means 45 which will be later described.

The separate-type torque sensing means 80 can be configured in a simple and low-cost structure as described above and power consumption of the battery incorporated in the rotary unit 41 of the torque sensing means 80 is reduced to a minimum amount, so that the torque sensing means 80 exhibits sufficient practicability. However, start timing of transmission of the detected torque data to the stationary unit 42 can be delayed depending on angular position of the rotary unit 41 on the drive shaft 34 at a point in time when the stationary unit 42 transmits a torque detection start signal upon receiving the tap changing command signal. There arises a shortcoming to be overcome by the present invention that tap change starting time can not be determined from torque waveform data with sufficient accuracy. Specifically, there occurs a maximum delay of approximately 200 ms, for instance.

The present invention is intended to enable sure detection of the torque data during tap change operation of the diverter switch despite this shortcoming. While details of how such torque data detection is realized will be later described, the discussion reverts to a description of the structure and operation of the on-load tap changer and the tap change operation monitoring apparatus therefor, based on which sure torque data detection is realized.

The tap change operation monitoring apparatus 40 takes in the torque waveform data detected by the torque sensor of the rotary unit 41 at sampling intervals of a specific frequency in the form of a voltage level signal. The voltage level signal is converted into a digital signal which is transmitted through the wireless link, received by the stationary unit 42 and input into a signal processing unit 43 which constitutes a principal part of the operation monitoring apparatus, whereby the tap change operation monitoring apparatus 40 monitors tap change operation of the on-load tap changer 30.

Figure 2:
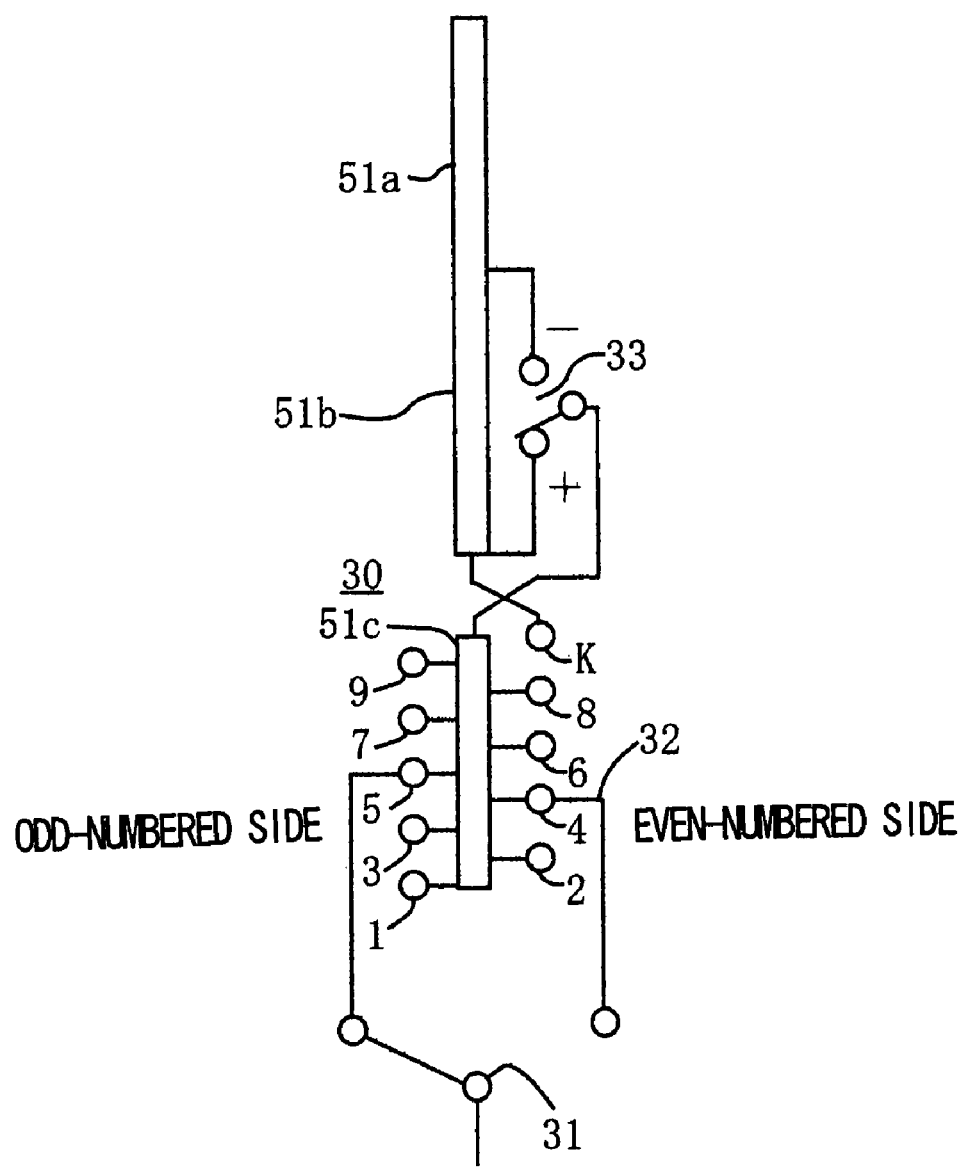
FIG. 2 is a circuit diagram showing the circuit configuration of the on-load tap changer.

FIG. 2 shows a typical circuit configuration of the on-load tap changer 30. The transformer 50 includes a primary winding 51a, a coarse-tapped winding 51b and a fine-tapped winding 51c, and the diverter switch 31, the tap selector 32 and the changeover selector 33 of the on-load tap changer 30 are connected as illustrated. Although the diverter switch 31 is provided with current-limiting resistors and contacts which make and break during the tap change operation in actuality, these elements are not illustrated. FIG. 3 shows a relationship among tap positions of the on-load tap changer and make-break states of individual constituent elements thereof, in which each circled numeral indicates a tap connected in-line.

Shown in FIG. 2 is a state in which the on-load tap changer 30 has stopped at tap position 5 after an upward switching stroke, that is, upon completion of tap changing from tap position 4 to the tap position 5. As can be seen from the make-break state at the tap position 5 in upward switching shown in FIG. 3, an odd-numbered side of the tap selector 32 is switched to a tap 5, an even-numbered side of the tap selector 32 is switched to a tap 4, the changeover selector 33 is switched to a positive tap (+) and the diverter switch 31 is switched to an odd-numbered side thereof, whereby there is formed a current path passing through the primary winding 51a, the coarse-tapped winding 51b, the positive tap (+) of the coarse-tapped winding 51b, the changeover selector 33, the fine-tapped winding 51c, the tap 5 of the fine-tapped winding 51c, the odd-numbered side of the tap selector 32 and the diverter switch 31 in this order.

If the on-load tap changer 30 changes tap connections from this state in the same upward switching direction as in the preceding switching stroke, or from the tap position 5 to tap position 6, the even-numbered side of the tap selector 32 through which the current path does not pass is first switched from the tap 4 to a tap 6 and then the diverter switch 31 is switched to an even-numbered side thereof. Consequently, the on-load tap changer 30 goes into a state of the tap position 6 in upward switching shown in FIG. 3.

When the on-load tap changer 30 changes tap connections in a downward switching direction, opposite to the switching direction in the preceding switching stroke, from the state shown in FIG. 2 (tap change operation in the direction opposite to the preceding switching direction is hereinafter referred to as reverse tap changing), it is not necessary for the tap selector 32 to perform any tap change operation anew because the even-numbered side of the tap selector 32 is already at the tap position 4 to be taken. Thus, the tap selector 32 does not perform any tap change operation and only the diverter switch 31 switches from the odd-numbered side to the even-numbered side, whereby the on-load tap changer 30 goes into a state of the tap position 4 in downward switching shown in FIG. 3.

In either of the aforementioned tap change operations, the changeover selector 33 does not operate (tap change operation in which the changeover selector 33 does not operate is hereinafter referred to as normal tap changing). The changeover selector 33 operates only when the on-load tap changer 30 is switched from tap position 10 to tap position 11 in upward switching and when the on-load tap changer 30 is switched from the tap position 10 to tap position 9 in downward switching as shown in FIG. 3 (tap change operation in which the changeover selector 33 operates is hereinafter referred to as changeover selector switching).

It is recognized from the above discussion that the on-load tap changer 30 exhibits six kinds of operation when categorized by operating states of the individual constituent elements. These six kinds of operation are upward and downward switching operations in which only the diverter switch 31 operates, upward and downward switching operations in which the tap selector 32 operates and upward and downward switching operations in which the tap selector 32 and the changeover selector 33 operate. These operating states are identified as different operating modes.

Figure 4:
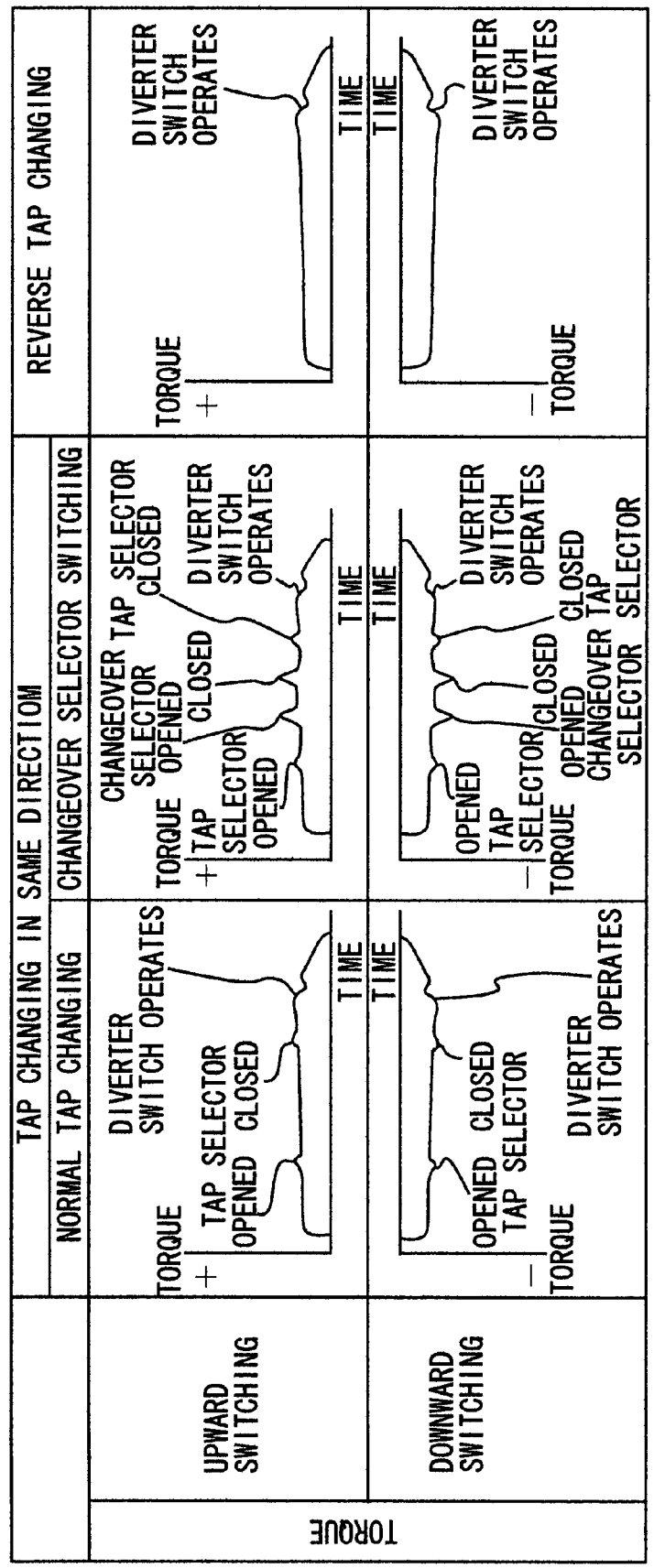
FIG. 4 is a diagram showing waveforms for individual operating modes of the on-load tap changer.

Torque waveforms detected in the six kinds of operating modes of the on-load tap changer are as shown in FIG. 4, in which torque values are detected on a positive side in upward switching and on a negative side in downward switching with the waveforms on the positive and negative sides having generally symmetrical shapes.

Figure 5:
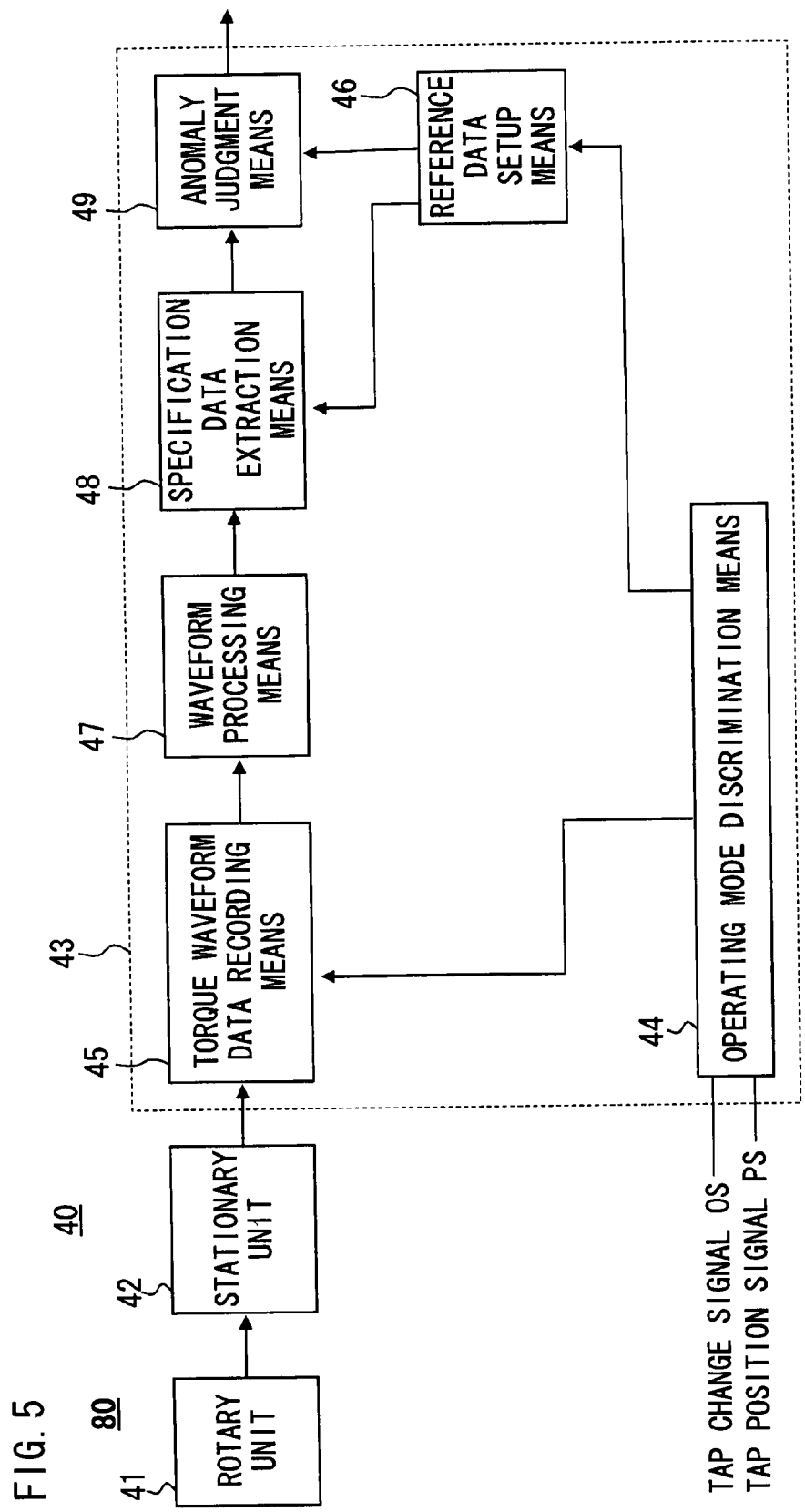
FIG. 5 is a block diagram showing the configuration of the tap change operation monitoring apparatus for the on-load tap changer.

Shown in FIG. 5 is a block diagram of the tap change operation monitoring apparatus for the on-load tap changer which operates in the aforementioned manner. The tap change operation monitoring apparatus 40 for monitoring tap change operation of the on-load tap changer 30 is made up of the torque sensing means 80 including the rotary unit 41 which is provided with the torque sensor and mounted on the drive shaft 34 and the stationary unit 42 which receives the detection data from the torque sensor through the wireless link, and the signal processing unit 43.

The signal processing unit 43 includes operating mode discrimination means 44 for discriminating operating mode in which the on-load tap changer 30 performs tap change operation, the torque waveform data recording means 45 for recording the torque waveform data detected by the torque sensing means 80 during tap change operation of the on-load tap changer 30 for each operating mode discriminated by the operating mode discrimination means 44, and reference data setup means 46 for setting monitoring target specification data for, each operating mode of the on-load tap changer 30 and then presetting and storing reference values of the monitoring target specification data and permissible variable ranges thereof. The signal processing unit 43 further includes waveform processing means 47 which extracts torque waveform data recorded in the torque waveform data recording means 45 and then extracts reference operating time of the aforementioned diverter switch 31 based on the extracted torque waveform data as will be later discussed in detail with reference to FIGS. 6 and 7, specification data extraction means 48 for extracting data corresponding to the monitoring target specification data as specification data from the reference operating time extracted by the waveform processing means 47 and processed torque waveform data, and anomaly judgment means 49 for comparing the specification data extracted by the specification data extraction means 48 with the reference values set by the reference data setup means 46 and judging that an anomaly has occurred if the result of comparison exceeds management values of the permissible variable ranges.

The working of each constituent element is described in the following. Referring to the configuration of FIGS. 1 and 5, the rotary unit 41 of the torque sensing means 80 is mounted on the rotating drive shaft 34 so that the stationary unit 42 can not take in a detected torque signal through a wired link. Thus, data detected by the rotary unit 41 is converted into a digital signal at specific intervals, such as at a sampling frequency of a few hundred Hz, transmitted through the wireless link and received by the stationary unit 42. Then, the digitized torque signal is taken into the signal processing unit 43 as the torque waveform data.

The operating mode discrimination means 44 provided in the signal processing unit 43 discriminates tap change operation of the on-load tap changer 30 in terms of the six kinds of operating modes shown in FIG. 4 from a tap change signal OS and a tap position signal PS fed from the operating mechanism 35 at each cycle of the tap change operation. The six kinds of operating modes are upward and downward switching operations in which only the diverter switch 31 operates, upward and downward switching operations in which the tap selector 32 operates and upward and downward switching operations in which the tap selector 32 and the changeover selector 33 operate.

The torque waveform data recording means 45 records the torque waveform data detected by the torque sensing means 80 for each operating mode discriminated by the operating mode discrimination means 44.

The reference data setup means 46 sets reference values of in-operation torque values and time differences of operating times from reference operating times individually for the tap selector 32, the changeover selector 33 and the diverter switch 31, as well as a reference torque value of the diverter switch 31 at tap change operation ending time thereof, for instance, as the monitoring target specification data and, then, the reference data setup means 46 presets and stores permissible variable ranges of the individual reference values, such as ±25% or ±50%.

Figure 6:
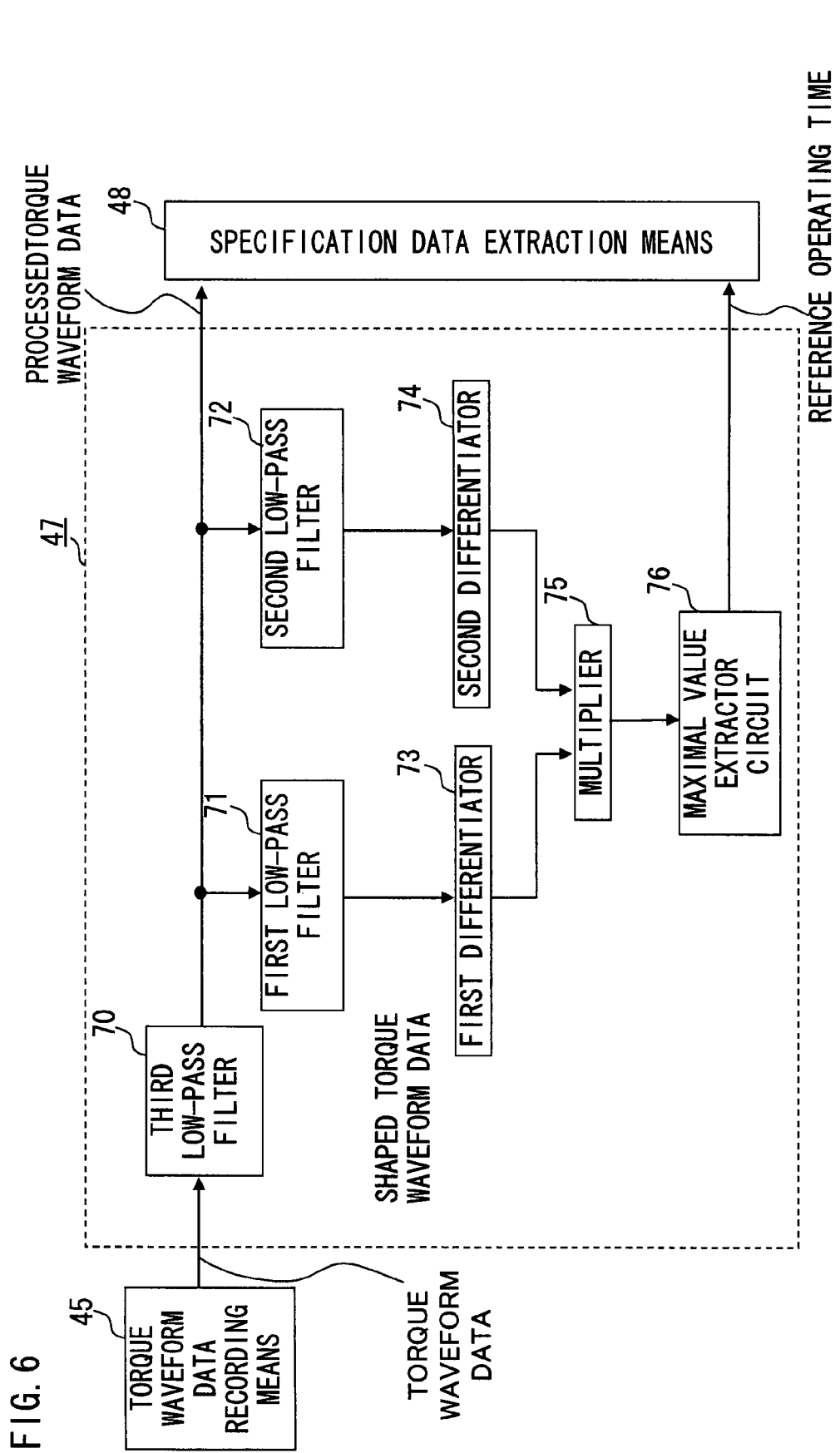
FIG. 6 is a block diagram showing the internal configuration of waveform processing means 47 of FIG. 5.
Figure 7:
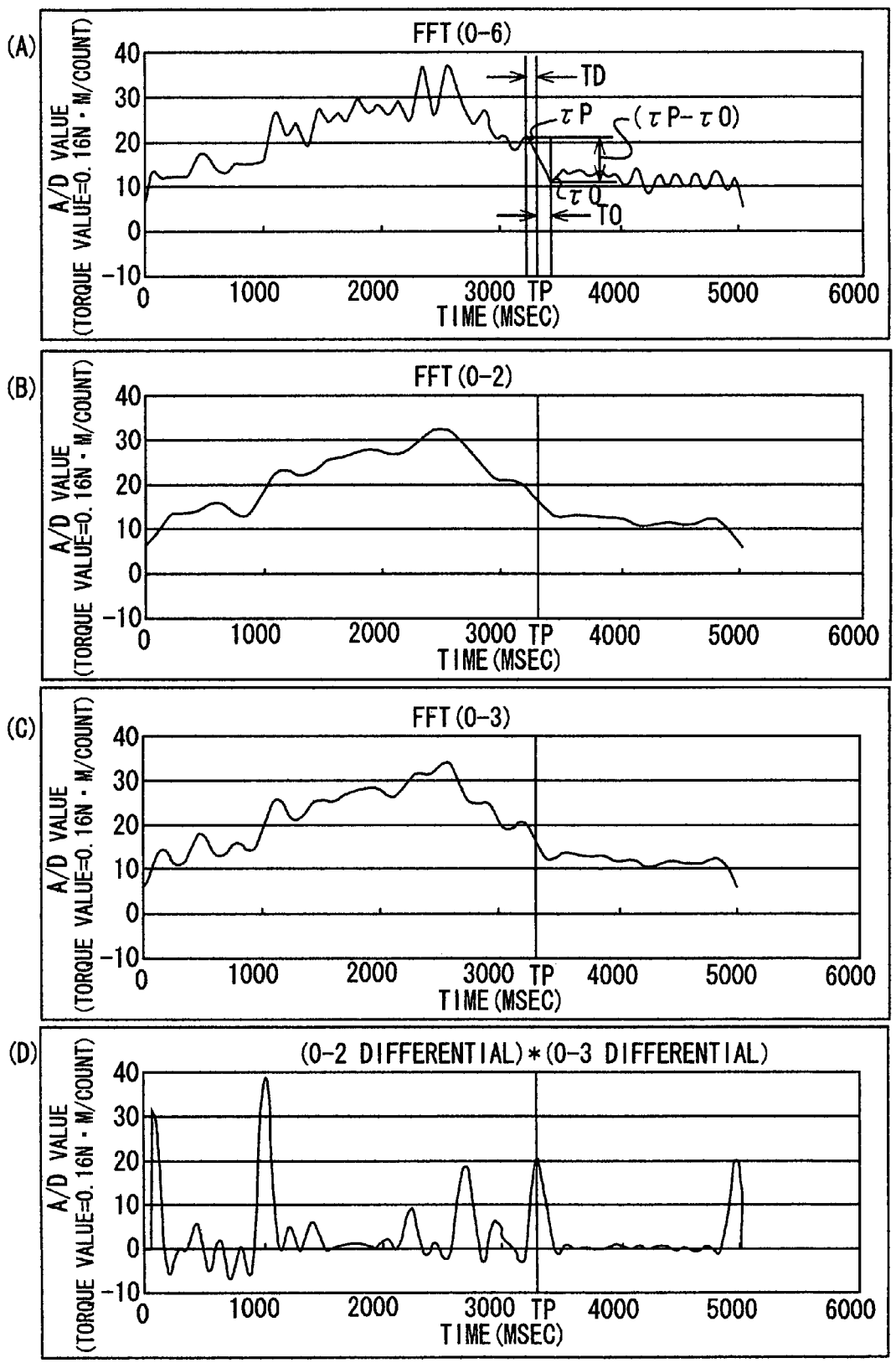
FIG. 7 is a diagram showing waveforms in waveform processing steps of torque waveform data processing by the waveform processing means 47.

Next, the configuration and working of the waveform processing means 47 are described in detail with reference to FIGS. 6 and 7. FIG. 6 is a block diagram showing the internal configuration of the waveform processing means 47, and FIG. 7 is a diagram showing waveforms in individual waveform processing steps of torque waveform data processing by the waveform processing means 47.

This waveform processing means 47 has been devised based especially on sharp torque reduction property exhibited during tap change operation of the diverter switch 31 which operates in all of the six switching modes shown in FIG. 4. The tap change operation of the diverter switch 31 is accomplished as a biasing mechanism of the diverter switch is suddenly released from a fully biased state. In this process, torque exerted on the drive shaft 34 sharply decreases from a maximal value in the biased state to a minimal value in a released state of the biasing mechanism. Special attention has been given to the fact that there exists a point in time at which change in the torque over time, or a value of time-domain differential of the torque, peaks halfway between the biased state and released state of the biasing mechanism.

The torque waveform data obtained by the torque sensing means 80 is processed by low-pass filters having as low cutoff frequencies as possible within a range in which the torque change caused by the tap change operation of the diverter switch 31 remains so that the point in time when the maximal value of the aforementioned torque differential value occurs. This arrangement has been employed to complete the present invention which makes it possible to generate shaped torque waveform data in which potential occurrence of a maximal value immediately before or after the point in time when the aforementioned maximal value occurs is suppressed as much as possible, and to detect a point in time when a maximum value of the aforementioned torque differential value, or the reference operating time, occurs based on the shaped torque waveform data with high accuracy.

It is not necessarily easy to theoretically determine specific characteristics of processing which enable the aforementioned operation. The inventors have been able to determine below-described optimum processing characteristics by systematically analyzing an enormous amount of data including over 2000 sets of data obtained with varying parameters of conditions.

The configuration and working of the waveform processing means 47 are described below with reference to FIGS. 6 and 7. First, the torque waveform data fed from the torque waveform data recording means 45 is processed by a third low-pass filter 70 and the processed torque waveform data from which noise components which occur at torque detection have been removed is sent to the specification data extraction means 48. The third low-pass filter 70 constitutes a noise filtering circuit which performs Fourier transform on an original waveform of the torque waveform data to be monitored recorded in the torque waveform data recording means 45 for filtering out noise followed by low-pass filtering operation for extracting 0-6 Hz (first frequency) components, whereby the third low-pass filter 70 outputs the processed torque waveform data. FIG. 7($a$) shows the waveform of the processed torque waveform data.

A first low-pass filter 71 and a second low-pass filter 72 constitute waveform shaping circuits which output the shaped torque waveform data by processing the processed torque waveform data fed from the third low-pass filter 70 by the low-pass filters having as low cutoff frequencies (second frequencies) as possible within the range in which the torque change caused by the tap change operation of the diverter switch 31 remains.

Given a reference frequency f which is a frequency at which a half period equals standard tap change operation time of the diverter switch 31, a cutoff frequency f1 of the first low-pass filter 71 is set to a value lower than the reference frequency f by a specified frequency width f, and a cutoff frequency f2 of the second low-pass filter 72 is set to a value higher than the reference frequency by the specified frequency width f.

Specifically, f=2.5 Hz and f=0.5 Hz, so that the first low-pass filter 71 functions as a low-pass filter having the cutoff frequency f1=f− f=2.0 Hz which is lower than the cutoff frequency 6 Hz of the third low-pass filter 70 aimed at removing noise components and, thus, outputs first shaped torque waveform data upon removing noise components exceeding this cutoff frequency in this embodiment. FIG. 7($b$) shows the waveform of the first shaped torque waveform data.

Also, the second low-pass filter 72 functions as a low-pass filter having the cutoff frequency f2=f+ f=3.0 Hz which is lower than the cutoff frequency 6 Hz of the third low-pass filter 70 and, thus, outputs second shaped torque waveform data upon removing noise components exceeding this cutoff frequency. FIG. 7($c$) shows the waveform of the second shaped torque waveform data.

In particular, if settings of the cutoff frequencies of the low-pass filters constituting these waveform shaping circuits are relatively high in the design of the low-pass filters, the shaped torque waveform data becomes similar to the original processed torque waveform data, making it impossible to differentiate a later-described maximal differential value from other nearby maximal values. If the cutoff frequencies are too low, on the contrary, a torque change caused by tap change operation of the diverter switch 31 becomes so small that it becomes impossible to identify the maximal differential value itself and, thus, to discriminate the same from other maximal values. Specific set values of the aforementioned low-pass filters 71, 72 have been obtained from the enormous results of the aforementioned cut-and-try experiments.

A first differentiator 73 and a second differentiator 74 are for calculating time-domain differentials of the first shaped torque waveform data output from the first low-pass filter 71 and the second shaped torque waveform data output from the second low-pass filter 72, respectively. The first and second differentiators 73, 74 are provided for determining a point of maximum torque change during tap change operation of the diverter switch 31.

A multiplier 75 calculates a product of an output of the first differentiator 73 and an output of the second differentiator 74, so that the aforementioned maximum torque change point conspicuously appears with positive polarity in a time-domain characteristic curve of the shaped torque waveform data. FIG. 7($d$) shows the waveform of the product output from this multiplier 75.

A maximal value extractor circuit 76 searches for a maximal value in the waveform of the product output from the multiplier 75 within a specific observation time period, extracts the point of maximum torque change as reference operating time tp and transmits the reference operating time tp to the specification data extraction means 48.

The aforementioned first and second differentiators 73, 74, multiplier 75 and maximal value extractor circuit 76 together constitute reference operating time extraction means of claim 1 of the present Application.

A comparison between the processed torque waveform data shown in FIG. 7($a$) obtained by removing only the noise components from the torque waveform data and the waveform of the product shown in FIG. 7($d$) obtained through additional waveform processing performed on the processed torque waveform data by the waveform shaping circuits 71, 72, the differentiators 73, 74 and the multiplier 75 reveals that the latter is the waveform showing conspicuously rising peak values in regions of large torque changes, the waveform having low levels immediately before and after each peak point. Therefore, it is possible to extract a timing of the aforementioned maximum value corresponding to the true reference operating time in a reliable fashion even if the observation time period for searching for the maximum value is extended in consideration of the fact that there occurs a delay of approximately 200 ms, for instance, in the tap change starting time which is determined based on the data from the torque sensing means 80.

While the aforementioned first and second waveform shaping circuits 71, 72 are set to a filter coefficient of f=0.5 Hz, generally the same advantageous effect was obtained, that is, the reference operating time could be extracted in a reliable fashion, within a range of f=0.5 to 1.0 Hz.

Also, while the waveform shaping circuits are configured by the first low-pass filter 71 whose cutoff frequency f1 is set to the value lower than the reference frequency f by the specified frequency width f and the cutoff frequency f2 of the second low-pass filter 72 is set to the value higher than the reference frequency by the specified frequency width f where the reference frequency f is the frequency at which the half period equals the standard tap change operation time of the diverter switch 31, the invention is not necessarily limited in its application to this configuration.

The specification data extraction means 48 extracts data corresponding to the monitoring target specification data for each operating mode set in the reference data setup means 46 as specification data from the processed torque waveform data processed by the waveform processing means 47 and data concerning the reference operating time. Referring to the processed torque waveform data shown in FIG. 7(a), maximal value occurrence time (tp−td) immediately before the reference operating time tp is specified as operation starting time of the diverter switch 31 and minimal value occurrence time (tp+to) immediately after the reference operating time tp is specified as operation ending time of the diverter switch 31, for example. Then, operation time of the diverter switch 31 which is a time duration (td+to) from the operation starting time to the operation ending time is extracted as the specification data.

Also, a torque value ($\tau o$) of the processed torque waveform data at the operation ending time (tp+to) is specified as a reference torque value, and in-operation torque ($\tau p - \tau o$) of the diverter switch 31 which is a difference between a torque value ($\tau p$) at the operation starting time (tp−td) and the reference torque value ($\tau o$) is extracted as the specification data.

While the torque value at the operation ending time of the diverter switch 31 is employed as the reference torque value, an arrangement may be made to determine in-operation torques of the tap selector 32 and the changeover selector 33 other than the diverter switch 31 using the reference torque value specified from the torque value at the operation ending time of the diverter switch 31 as reference torque values of the tap selector 32 and the changeover selector 33.

The anomaly judgment means 49 compares the specification data extracted from the processed torque waveform data and the reference operating time by the specification data extraction means 48 with the reference value of the monitoring target specification data for the current operating mode set in the reference data setup means 46. The anomaly judgment means 49 judges that the diverter switch 31 is in normal operation if a difference calculated by this comparison does not exceed the corresponding permissible variable range, and that the diverter switch 31 is in abnormal operation if the difference exceeds the corresponding permissible variable range. Subsequently, the anomaly judgment means 49 outputs a judgment result.

It is possible to determine whether the tap selector 32 and the changeover selector 33 are in normal operation or not in a manner similar to what has been described above with respect to the diverter switch 31. This is accomplished by extracting reference operating time from a point in time when a peak occurs in a product waveform within an operation time period of each of the tap selector 32 and the changeover selector 33, extracting operation times and in-operation torques of the tap selector 32 and the changeover selector 33 as specification data from respective processed torque waveform data and reference operating times, and comparing the specification data with corresponding reference values.

As thus far described, it is possible to detect the torque data during the tap change operation of the diverter switch 31 in a reliable fashion even if a slight error occurs in the tap change starting time determined from the torque waveform data fed from the torque sensing means 80. It is therefore possible to judge whether any anomaly has occurred with high accuracy using a simple and low-cost structure according to the first embodiment of the present invention.

Second Embodiment

Described below is an arrangement for realizing a more appropriate tap change operation monitoring apparatus by modifying the individual reference values and the numerical values of the permissible variable ranges thereof set by the aforementioned reference data setup means 46 of FIG. 5 in consideration of their variations with time occurring as a result of continued operation of the on-load tap changer. The following discussion deals mainly with differences from the foregoing first embodiment.

Figure 8:
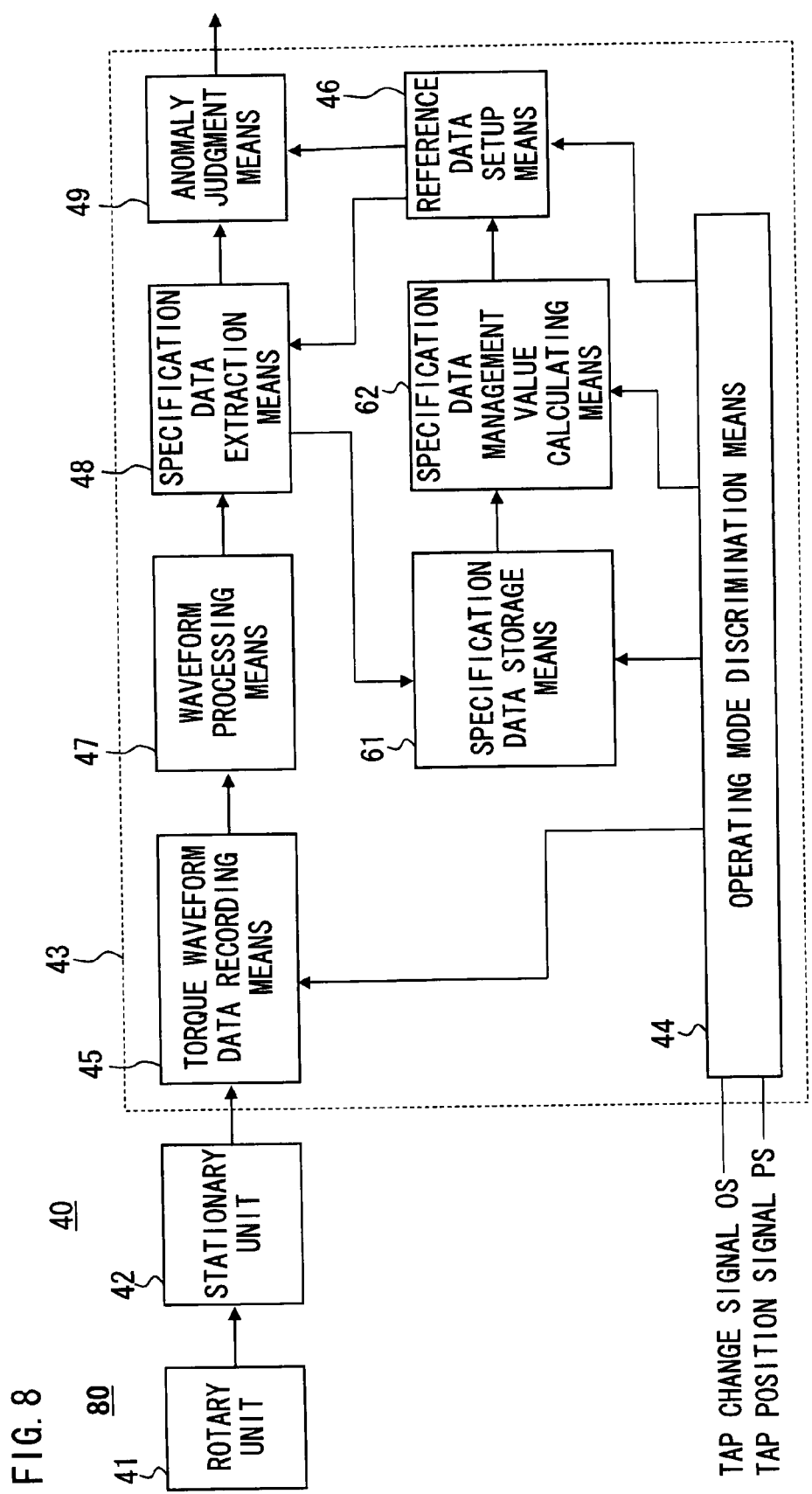
FIG. 8 is a block diagram showing the configuration of a tap change operation monitoring apparatus for an on-load tap apparatus according to a second embodiment of the present invention.

FIG. 8 is a block diagram showing a tap change operation monitoring apparatus for an on-load tap apparatus according to a second embodiment of the present invention. Specification data storage means 61 and specification data management value calculating means 62 are added to the signal processing unit 43 which was described with reference to FIG. 5 and there is provided reference data setup means 63. The discussion below centers on the working of these modified parts.

The specification data extraction means 48 extracts data corresponding to the monitoring target specification data for each operating mode set in the reference data setup means 63 as specification data from the processed torque waveform data processed by the waveform processing means 47 and outputs the extracted specification data to the anomaly judgment means 49. Additionally, the specification data is accumulated as accumulation data in the specification data storage means 61 which will be later described.

Extraction of the specification data by the specification data extraction means 48 is further explained.

FIG. 9 is a listing of items detected in individual operating modes, in which individual circles indicate specification data items to be extracted.

Shown in FIG. 10 is an example of the processed torque waveform data processed by the waveform processing means 47 in the case of upward changeover selector switching. Described below is a procedure for extracting the individual specification data items to be extracted shown in FIG. 9 from the processed torque waveform data.

(1) A time period for extracting operating times of the diverter switch 31, the tap selector 32 and the changeover selector 33 within operation time periods thereof and a torque value from the processed torque waveform data (e.g., FIG. 10) are set in relation to the reference operating time tp specified by the waveform processing means 47.

(2) A reference torque value το is specified from a torque value at or after the operation ending time of the diverter switch 31.

(3) The operation starting time and operation ending time of the diverter switch 31 are specified and then the operation time and in-operation torque value are specified.

(4) Time periods for extracting torque values of the tap selector 32 and the changeover selector 33 are set, times of occurrence of torque peak values and torque values of the tap selector 32 and the changeover selector 33 are specified, and the operation times and in-operation torques values are extracted.

(5) Tap change time and torque integral value are determined from the processed torque waveform data.

(6) The individual data specified are output to the specification data storage means 61 and the anomaly judgment means 49.

The anomaly judgment means 49 compares the processed torque waveform data extracted by the specification data extraction means 48 with the reference value of the monitoring target specification data for the current operating mode set in the reference data setup means 63. The anomaly judgment means 49 judges that the on-load tap changer is in normal operation if a difference calculated by this comparison does not exceed the corresponding permissible variable range, and that the on-load tap changer is in abnormal operation if the difference exceeds the corresponding permissible variable range. Subsequently, the anomaly judgment means 49 outputs a judgment result.

The specification data storage means 61 arranges the specification data fed from the specification data extraction means 48 in time series for each operating mode and data item to be monitored and accumulates the arranged specification data.

At a point in time when the number of data pieces accumulated in the specification data storage means 61 reaches a preset number of data pieces, the specification data management value calculating means 62 calculates a mean value, a standard deviation, etc. for each operating mode and item of extracted data by performing statistical operation.

The specification data management value calculating means 62 sets reference values and management values of the permissible variable ranges for individual items of the specification data and updates the management values set in the reference data setup means 63 based on calculated mean values and standard deviations.

While the management values set in the reference data setup means 63 are updated each time a specific number of data pieces accumulate as standard, updating may be made each time a specific period of on-time elapses.

Operational data of the tap change operation monitoring apparatus for the on-load tap changer 30 is not available so that it is impossible to set reference data in the reference data setup means 63 immediately after installation. Thus, reference data for initial conditions are set based on data obtained in an operational test and trial run conducted after manufacture of the monitoring apparatus.

While operational life of each part of the diverter switch 31 of the on-load tap changer 30 that is opened and closed frequently varies due to wearing of electrodes, for instance, it becomes possible to diagnose aging conditions of the on-load tap changer 30 if an updating history of the management values set in the reference data setup means 63 is stored.

As thus far described, the management values of the monitoring target specification data are automatically updated each time a specific number of operational data pieces accumulate as drive torque of the on-load tap changer 30 varies with the lapse of time in the second embodiment of the present invention. As a consequence, it becomes unnecessary to carry out data collection and management value updating operation for collecting torque waveform data and updating set values of the management values in order to update the management values as conventionally required. This produces an advantageous effect reducing running cost.

Given a reference frequency which is a frequency at which a half period equals standard tap change operation time of the diverter switch in each variation of the present invention, the waveform shaping circuit includes a first low-pass filter for removing frequency components exceeding a frequency lower than the reference frequency by a specified frequency width from the processed torque waveform data, and a second low-pass filter for removing frequency components exceeding a frequency higher than the reference frequency by the specified frequency width from the processed torque waveform data, and the reference operating time extraction means includes a first differentiator for differentiating an output of the first low-pass filter, a second differentiator for differentiating an output of the second low-pass filter, a multiplier for calculating a product of the outputs of the two differentiators, and a maximal value extractor circuit for extracting time of occurrence of a maximal value of a product waveform output from the multiplier within the specific time period as the reference operating time. It is therefore possible to detect the reference operating time with high accuracy.

Also, a cutoff frequency of the first low-pass filter is set to a frequency lower than the reference frequency by 0.5 to 1 Hz, and a cutoff frequency of the second low-pass filter is set to a frequency higher than the reference frequency by 0.5 to 1 Hz. It is therefore possible to detect the reference operating time with high accuracy and reliability.

Also, the specification data extraction means specifies maximal value occurrence time immediately before the reference operating time in the processed torque waveform data as operation starting time of the diverter switch and minimal value occurrence time immediately after the reference operating time in the processed torque waveform data as operation ending time of the diverter switch, and extracts operation time of the diverter switch which is a time duration from the operation starting time to the operation ending time as the specification data. It is therefore possible to recognize whether or not there is any anomaly in the operation time of the diverter switch during operation thereof.

Also, the specification data extraction means specifies a torque value of the processed torque waveform data at the operation ending time as a reference torque value and extracts in-operation torque of the diverter switch which is a difference between a torque value at the operation starting time and the reference torque value as the specification data. It is therefore possible to recognize whether or not there is any anomaly in the in-operation torque of the diverter switch during operation thereof.

Also, the torque sensing means includes a rotary unit which is mounted on an outer surface of the rotating drive shaft and provided with a torque sensor for detecting the drive shaft torque and first transmit/receive means, and a stationary unit provided with a second transmit/receive means for exchanging signals with the first transmit/receive means through a wireless link, wherein the torque sensor begins detecting operation when a tap changing command signal from the on-load tap changer is transmitted from the second transmit/ receive means of the stationary unit and received by the first transmit/receive means of the rotary unit, and resultant detection data is transmitted from the first transmit/receive means of the rotary unit, received by the second transmit/receive means of the stationary unit and then sent to the torque waveform data recording means. It is therefore possible to produce the torque sensing means with ease and at low cost, yet enabling easy installation of the torque sensing means on an existing system.

Also, there are provided specification data storage means for accumulating individual pieces of the specification data extracted by the specification data extraction means for each operating mode, and specification data management value calculating means for extracting and statistically processing the accumulated specification data for each operating mode and for each item of the monitoring target specification data to calculate the reference value and the management value of the permissible variable range for each item of the monitoring target specification data and then updating the reference value and the management value of the permissible variable range set in the reference data setup means each time a specific amount of specification data is accumulated in the specification data storage means. This makes it possible to monitor tap change operation more properly in consideration of a history of previous operation.

Also, the specification data management value calculating means updates the reference value and the management value of the permissible variable range set in the reference data setup means each time accumulation data reaches a preset number of data pieces. This permits smooth and reliable updating operation.

Also, the specification data management value calculating means updates the reference value and the management value of the permissible variable range set in the reference data setup means each time a preset period of time elapses. This permits smooth and reliable updating operation.

Also, when the reference value and the management value of the permissible variable range set in the reference data setup means are updated, the reference value and the management value of the permissible variable range set before updating are stored to keep a history of the reference value and management value of the permissible variable range for a specific period of time. This makes it possible to diagnose aging conditions of the on-load tap changer.

The invention claimed is:

1. A tap change operation monitoring apparatus for an on-load tap changer, said tap change operation monitoring apparatus comprising:
   torque sensing means for detecting drive shaft torque exerted on a drive shaft of an operating mechanism for operating said on-load tap changer which is provided with a diverter switch, a tap selector and a changeover selector;
   operating mode discrimination means for discriminating operating mode in which said on-load tap changer performs tap change operation;
   torque waveform data recording means for recording torque waveform data concerning said drive shaft torque detected by said torque sensing means for each operating mode discriminated by said operating mode discrimination means;
   reference data setup means for setting monitoring target specification data for each operating mode of said on-load tap changer and then setting and storing a reference value of said monitoring target specification data and a management value of a permissible variable range thereof;
   waveform processing means including:
      a noise filtering circuit for extracting the torque waveform data recorded in said torque waveform data recording means and generating processed torque waveform data from which noise components have been removed by removing frequency components exceeding a specific first frequency from the extracted torque waveform data;
      a waveform shaping circuit for generating shaped torque waveform data by removing frequency components exceeding a specific second frequency which is lower than said first frequency and set within a range in which a torque change caused by the tap change operation of said diverter switch remains in a torque waveform after shaping; and
      reference operating time extraction means for extracting time of occurrence of an extremum of a waveform obtained by differentiating said shaped torque waveform data in the time domain within a specific time period as reference operating time;
   specification data extraction means for extracting data corresponding to said monitoring target specification data as specification data from the reference operating time extracted by said waveform processing means and said processed torque waveform data; and
   anomaly judgment means for comparing the specification data extracted by said specification data extraction means with the reference value set by said reference data setup means and judging that an anomaly has occurred if the result of comparison exceeds the management value of said permissible variable range.

2. The tap change operation monitoring apparatus for the on-load tap changer as recited in claim 1, said tap change operation monitoring apparatus being characterized in that, given a reference frequency which is a frequency at which a half period equals standard tap change operation time of said diverter switch,
   said waveform shaping circuit includes:
   a first low-pass filter for removing frequency components exceeding a frequency lower than said reference frequency by a specified frequency width from said processed torque waveform data; and
   a second low-pass filter for removing frequency components exceeding a frequency higher than said reference frequency by the specified frequency width from said processed torque waveform data; and
   said reference operating time extraction means includes:
   a first differentiator for differentiating an output of said first low-pass filter;
   a second differentiator for differentiating an output of said second low-pass filter;
   a multiplier for calculating a product of the outputs of said two differentiators; and
   a maximal value extractor circuit for extracting time of occurrence of a maximal value of a product waveform output from said multiplier within said specific time period as said reference operating time.

3. The tap change operation monitoring apparatus for the on-load tap changer as recited in claim 2, said tap change operation monitoring apparatus being characterized in that a cutoff frequency of said first low-pass filter is set to a frequency lower than said reference frequency by 0.5 to 1 Hz, and a cutoff frequency of said second low-pass filter is set to a frequency higher than said reference frequency by 0.5 to 1 Hz.

4. The tap change operation monitoring apparatus for the on-load tap changer as recited in claim 1, said tap change operation monitoring apparatus being characterized in that said specification data extraction means specifies maximal value occurrence time immediately before said reference operating time in said processed torque waveform data as operation starting time of said diverter switch and minimal value occurrence time immediately after said reference operating time in said processed torque waveform data as operation ending time of said diverter switch, and extracts operation time of said diverter switch which is a time duration from said operation starting time to said operation ending time as said specification data.

5. The tap change operation monitoring apparatus for the on-load tap changer as recited in claim 4, said tap change operation monitoring apparatus being characterized in that said specification data extraction means specifies a torque value of said processed torque waveform data at said operation ending time as a reference torque value and extracts in-operation torque of said diverter switch which is a difference between a torque value at said operation starting time and said reference torque value as said specification data.

6. The tap change operation monitoring apparatus for the on-load tap changer as recited in claim 1, said tap change operation monitoring apparatus being characterized in that said torque sensing means includes:
   a rotary unit which is mounted on an outer surface of said rotating drive shaft and provided with a torque sensor for detecting said drive shaft torque and first transmit/receive means; and
   a stationary unit provided with a second transmit/receive means for exchanging signals with said first transmit/receive means through a wireless link;
   wherein said torque sensor begins detecting operation when a tap changing command signal from said on-load tap changer is transmitted from said second transmit/receive means of said stationary unit and received by said first transmit/receive means of said rotary unit, and resultant detection data is transmitted from the first transmit/receive means of said rotary unit, received by said second transmit/receive means of said stationary unit and then sent to said torque waveform data recording means.

7. The tap change operation monitoring apparatus for the on-load tap changer as recited in claim 1, said tap change operation monitoring apparatus being characterized by further comprising:

specification data storage means for accumulating individual pieces of the specification data extracted by said specification data extraction means for each operating mode; and specification data management value calculating means for extracting and statistically processing the accumulated specification data for each operating mode and for each item of said monitoring target specification data to calculate the reference value and the management value of the permissible variable range for each item of said monitoring target specification data and then updating the reference value and the management value of the permissible variable range set in said reference data setup means each time a specific amount of specification data is accumulated in said specification data storage means.

8. The tap change operation monitoring apparatus for the on-load tap changer as recited in claim 7, said tap change operation monitoring apparatus being characterized in that said specification data management value calculating means updates the reference value and the management value of the permissible variable range set in said reference data setup means each time accumulation data reaches a preset number of data pieces.

9. The tap change operation monitoring apparatus for the on-load tap changer as recited in claim 7, said tap change operation monitoring apparatus being characterized in that said specification data management value calculating means updates the reference value and the management value of the permissible variable range set in said reference data setup means each time a preset period of time elapses.

10. The tap change operation monitoring apparatus for the on-load tap changer as recited in claim 7, said tap change operation monitoring apparatus being characterized in that, when the reference value and the management value of the permissible variable range set in said reference data setup means are updated, the reference value and the management value of the permissible variable range set before updating are stored to keep a history of said reference value and management value of the permissible variable range for a specific period of time.

* * * * *